Dec. 18, 1945. P. ARNOLDI 2,391,001
SECONDARY BATTERY
Filed Sept. 9, 1941 2 Sheets-Sheet 1
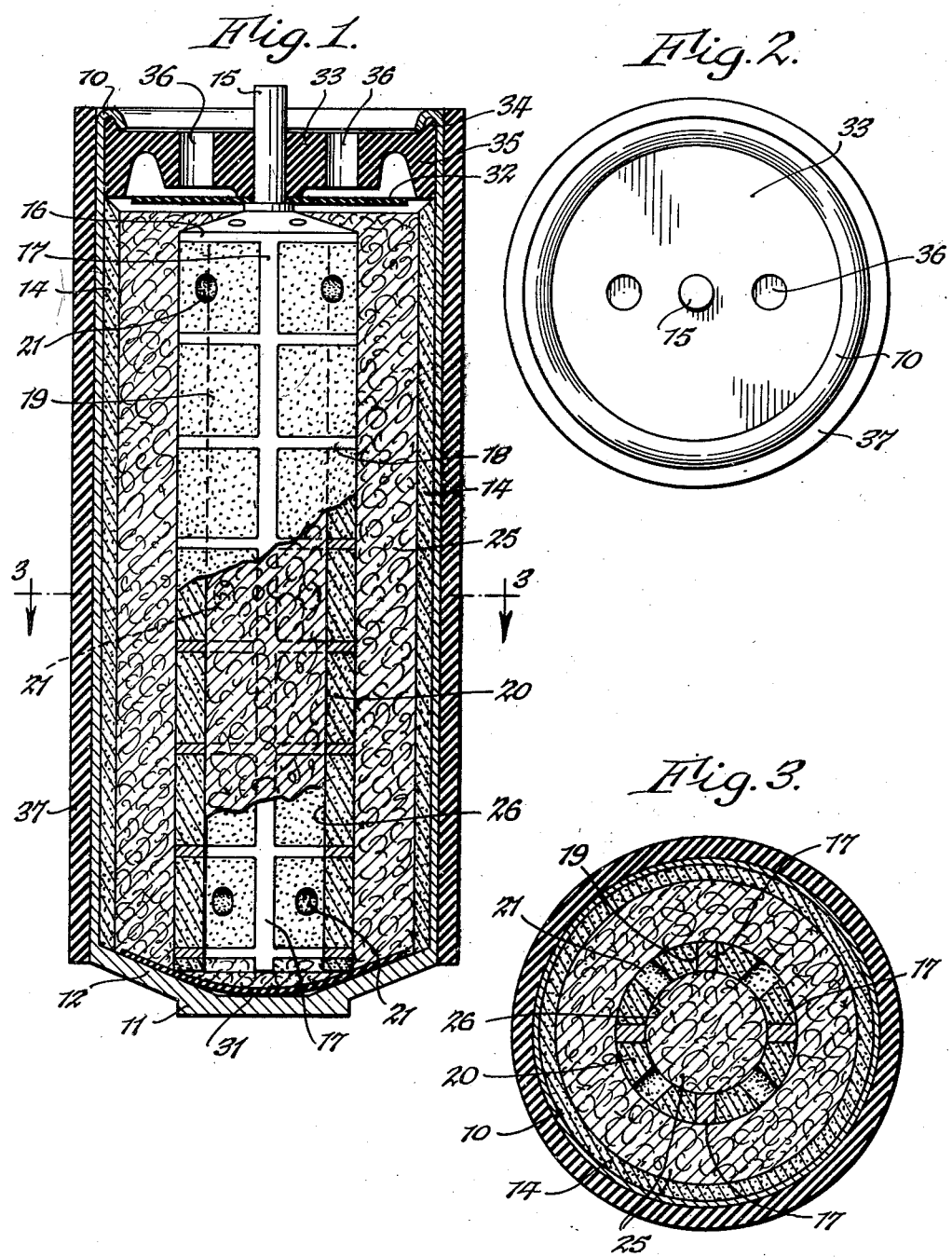

Dec. 18, 1945.  P. ARNOLDI  2,391,001
SECONDARY BATTERY
Filed Sept. 9, 1941  2 Sheets-Sheet 2

INVENTOR
Paul Arnoldi
BY
Popps and Popps
ATTORNEYS

Patented Dec. 18, 1945

2,391,001

UNITED STATES PATENT OFFICE 2,391,001

SECONDARY BATTERY

Paul Arnoldi, Brighton, Ontario, Canada

Application September 9, 1941, Serial No. 410,155

1 Claim. (Cl. 136—7)

This invention relates to a secondary electric battery and more particularly to such a battery which is readily recharged and from which the electrolyte cannot spill or creep.

One of the objects of the invention is to provide a secondary battery in which the casing of the battery forms a cylindrical electrode and in which the other electrode is in the form of a substantially cylindrical grid arranged concentrically within the casing thereby to provide uniform spacing between the active surfaces of the two electrodes.

Another object of the invention is to provide such a battery in which the inner electrode is in the form of a hollow cylinder with the electrolyte in contact with both the inner and outer surfaces of the hollow cylinder so as to render both of these surfaces active.

Another object is to provide such a battery in which the space within the inner electrode and the space between the inner electrode and the case is filled with an absorbent material which holds the electrolyte in an absorbed condition, the inner electrode being so formed as to provide communication between the electrolyte contained within the inner electrode and the electrolyte contained in the space between the inner electrode and the casing.

Another object is to provide means for establishing communication between the electrolyte contained in the absorbent material within the inner electrode and the electrolyte contained in the absorbent material in the space between the inner electrode and the casing, which means also serves to increase the surface of the active material on the inner electrode.

Another object of the invention is to provide such a battery in which an excess of active material is provided on both the positive and the negative electrode in relation to the amount of electrolyte which the battery contains, this excess of active material on the electrodes insuring against total discharge of the electrodes even after the full amount of the electrolyte has been used up by the electrodes. By this means the electrodes are prevented from being coated with the insoluble crystalline sulfate which forms only after a complete discharge of the active material of the electrodes and which fills the fine pores of the active material with which the electrodes are coated and prevents the proper recharging of the battery.

Another object of the invention is to so form the inner electrode as to provide the maximum exposed surface of the active material with which this electrode is filled.

Another object of the invention is to so proportion the space within the inner electrode; the form and thickness of this inner electrode; and the space between this inner electrode and the outer shell or electrode as to provide the proper distribution of the electrolyte to obtain the maximum efficiency and capacity within a battery of predetermined size.

In the accompanying drawings:

Fig. 1 is a vertical longitudinal section through one form of a battery embodying my invention.

Fig. 2 is a top plan view thereof.

Fig. 3 is a horizontal section, taken on line 3—3, Fig. 1.

Figure 4:
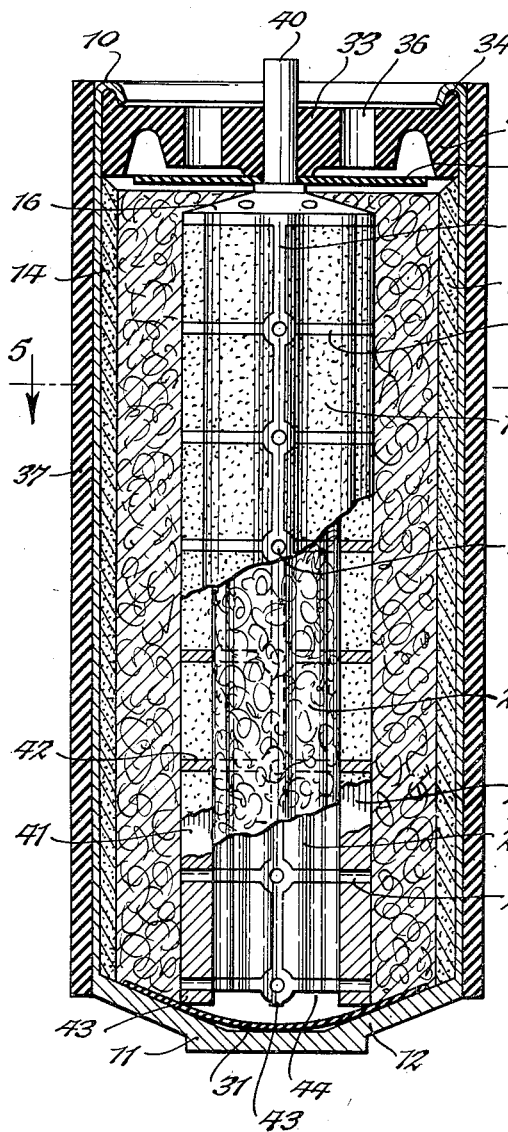
Fig. 4 is a view similar to Fig. 1 showing a modified form of my invention.

The metal shell 10 of the battery is preferably made of cylindrical form and formed by spinning or extruding the metal from an integral base 11 which is preferably flat on its inner side so as to provide adequate support for the negative electrode. This base 11 is also preferably interiorly dished, as indicated at 12, for a purpose which will presently appear. The battery illustrated is particularly designed to operate with lead peroxide as the active positive electrode material and the spongy lead 14 as the active negative electrode material and the shell 10 and bottom 11 are therefore shown as made of lead, lead-antimony or other alloys commonly employed in secondary batteries of this type. This shell 10 serves as the negative electrode of the battery and its cylindrical interior is therefore coated with the negative active material, preferably in the following manner.

Semi-liquid paste is formed of litharge (PbO) and sulfuric acid, the sulfuric acid preferably having a hydrometer test of 1100 specific gravity. Red lead ($Pb_3O_4$) may be employed instead of litharge. Sufficient quantity of this paste is placed in the shell 10 and the open end is temporarily closed. As soon thereafter as possible the shell is then placed in a suitable machine and rapidly rotated. The solid products of the reaction of the lead oxide and sulfuric acid are thereby, by centrifugal force, very solidly compacted against the inner surface of the shell 10 while the liquid is substantially all extruded from the solidifying mass and passes toward the center of the shell. The spinning operation requires less than one minute and after this the coating of spongy lead is formed in the ordinary way by electrolysis. When thus formed the negative electrode comprises the solid lead wall of the shell 10 and a thick interior coating of spongy lead 14 in intimate contact with the solid lead wall. The negative electrode so formed is durable in that the coating, whether in the spongy lead or oxide condition, does not readily break away from the solid lead wall of the shell 10 and in that sulfation does not take place between the coating 14 and the solid lead wall of the shell 10 as is liable to be the case when the paste for forming the spongy coating is pasted on the lead shell in the conventional manner. The coating, it will be noted, does not extend quite up to the top of the solid lead wall of the shell 10.

The positive element or grid of the battery comprises a central metal post 15, the lower part of which is made in the form of a cylindrical grid 16, this grid being shown as composed of a plurality of vertical parallel bars 17 arranged equidistant from the axis of the grid and connected by horizontal parallel metal rings 18 so as to form a grid having a plurality of generally rectangular spaces or openings 19 of substantial depth and of uniform size. These spaces 19 between the bars and rings are filled with active material 20 to form a hollow cylinder, thus exposing two cylindrical surfaces to the electrolyte. This active material 20 can be red lead or litharge. To render both the interior and exterior cylindrical surfaces of the pasted positive element or grid effective, it is necessary that both of these surfaces be in contact with the electrolyte and that the electrolyte contained within the positive element or grid be in communication with the electrolyte surrounding the positive element or grid. For this purpose, in the form of the invention shown in Figs. 1-3, a plurality of holes 21 are shown as provided which extend through the filling of active material contained within certain of the spaces 19. These holes 21 are preferably arranged so as to be distributed the full length of the positive electrode or grid so as to insure uniformity in the operation of the battery. I have shown four such holes provided in equally spaced relation at each end of the positive electrode grid and an annular series of four such holes provided at the center of the grid. It will be understood, however, that the number and arrangement of these holes can be varied. It will further be seen that the provision of these holes 21 substantially increases the effective exposed surface of the active material 20 with which the spaces 19 are filled.

The electrolyte is preferably absorbed and contained in a pulverized filler 25 which is both packed into the cylindrical interior space 26 of the positive element or grid and is also packed into the casing 10 and fills the space between the spongy lead on the casing 10 and the active exterior surface of the paste with which the positive electrode or grid is filled. It is important that the filler 25 be firmly compacted so as to firmly bear against the entire active surface of the paste 20 held by the positive electrode or grid and so as to firmly bear against the exposed inner face of the spongy lead coating 14, the filler thereby preventing the displacement of the paste from the positive electrode and the coating from the negative electrode, thereby insuring high capacity with a small battery and preventing shorting of the battery by oxides which might otherwise fall away and short the battery.

The electrolyte employed is preferably sulfuric acid having a hydrometer test of 1280 specific gravity and it is important that the filler 25 employed be such as to absorb the electrolyte and at the same time be unaffected by the acidity of the electrolyte. While such absorbents, such as infusorial earth, glass and sawdust, can be used, the filler which I have found most suitable for this purpose is naturally carbonized vegetation, such as sphagnum moss found at considerable depth in bogs and which has undergone natural carbonization and has been subjected to natural acid conditions so that the carbonized moss is rendered inert to the high concentration of sulfuric acid in the electrolyte employed. Such naturally carbonized vegetation is dried and pulverized and the electrolyte added, the electrolyte being held in suspension within the particles of the filler.

In assembling the battery an insulating disk 31 of rubber or other suitable material is fitted below the lower end of the positive grid and into the dished bottom 11 of the shell, this disk serving as a separator between the electrodes to center the lower end of the positive electrode and hold it in coaxial and insulated relation to the lead shell 10. This disk 31 also serves to seal the lower end of the positive electrode so that the only communication between the interior space within this positive electrode and the exterior space surrounding this positive electrode is through the holes 21. Before the positive electrode is inserted into this shell it is first filled with the pulverized filler saturated with electrolyte but preferably not to the point of wetness. After the positive electrode has been inserted into the shell and into engagement with the insulating disk 31, the space between the positive electrode and the shell is similarly filled with the pulverized filler which is also saturated with the electrolyte but preferably not to the point of wetness. Another disk 32 of rubber or other insulating material is then fitted over the post 15 of the positive electrode, this disk serving as a separator between the electrodes at the upper end of the battery. A cap 33 is then fitted over the post 15 of the positive electrode, this cap preferably having a rim composed of upwardly and downwardly extending flanges 34 and 35 and a hub which bears against the disk 32. Between its hub and its rim the cap 33 is preferably provided with openings 36 through which any gases generated in the electrolyte can escape and through which additional water can be introduced to make up for any gas losses in the electrolyte absorbed in the filler. The cap is preferably secured in place by turning the upper edge of the lead shell 10 over the upwardly extending flange 34 of the cap, this operation positively securing the cap against the insulating washer 32 supported by the positive electrode. It is also preferable that the lower flange 35 of the cap 33 extends down to the sponge lead coating 14 within the shell 10 so as to cover the base lead at the upper end of the shell and avoid its deterioration. It is also advisable to coat the cap 33 with a varnish of Bakelite or other phenol condensation product to reduce creeping of the electrolyte over the surfaces of the cap. The cap can be made of any insulating material. The shell 10 is preferably protected by a cylindrical sleeve 37 which can be made of any suitable material.

An important feature of the present invention resides in the provision of an excess of the pasted material 20 in the spaces 19 of the positive electrode and also in the provision of an excessive amount of the sponge lead 14 on the interior of the lead shell 10. By an excess of the amount of this positive and negative active material is meant an excess of that required to insure full discharge of the electrolyte absorbed into the filler 25. Thus the active materials to produce one ampere hour in a battery of this type is 3.86 grams of the spongy lead or negative active material; 4.45 grams of the lead peroxide or positive active material and 13.47 grams of sulfuric acid (1280 S. G.), the positive active material using 65% more acid than the negative active material. In accordance with my invention, both the positive and the negative active material are used in excess of this ratio. The use of an excessive amount of active material on both the positive and negative electrodes prevents the formation of a crystalline insoluble white sulfate as a coating on the active surfaces of the positive and negative electrodes. Such a coating of crystalline sulfate fills the pores of the active material with which the positive and negative electrodes are coated and renders it practically impossible to recharge the battery, an excessive voltage and an excessive length of time being required to recharge a battery so sulfated. By the provision of an excessive amount of both the coating 20 on the positive electrode and the spongy lead coating 14 on the negative electrode, these coatings do not become fully discharged even when the electrolyte is fully exhausted. The battery can therefore be fully discharged by the complete exhaustion of the electrolyte and the active material on the positive and negative electrodes will remain partly charged, thereby to avoid all danger of an undesirable sulfation of these electrodes.

It will be also noted that the holes 21 extending through the active material 20 of the positive electrode serve not only to increase the effective surface of this active material but also provide communication between the electrolyte absorbed in the material contained within the positive electrode and the electrolyte absorbed in the material arranged between the positive and the negative electrodes. These holes thereby render both the interior surface of the positive electrode and also the electrolyte contained within this electrode fully effective and useful in the functioning of the battery. Further, the uniform distribution of these holes 21 the full length of the positive electrode insures their proper functioning in establishing communication with the interior of the positive electrode under all conditions of operation.

It is further important that in the design of the battery shown in Figs. 1-3 the interior space of the positive electrode; the effective thickness of this electrode; and the space between this electrode and the negative electrode or case of the battery be carefully proportioned to secure the maximum capacity and efficiency with a battery of any given size. Thus, it is necessary that the amount of electrolyte contained in the cylindrical space within the positive electrode be just enough to properly coact with the inside surface of the active material with which the spaces of this electrode are filled and it is necessary that the electrolyte contained in the space between the two electrodes be just enough to properly coact with the exterior surface of the paste of the positive electrode and also the inside surface of the outer or negative electrode. I have found that to secure the maximum efficiency and capacity with a battery of the smallest diameter it is desirable that with a positive electrode having an inside diameter of one-half inch, the exterior diameter of this electrode be three-quarters of an inch and the inside diameter of the negative electrode be one and one-quarter inches. While these proportions may be slightly varied, to secure the maximum efficiency and capacity with a battery of minimum overall size, it is desirable that these proportions be substantially maintained. Such proportioning allocates the required amount of electrolyte to all of the surfaces of the two electrodes without the provision of an excessive amount of electrolyte in the battery. The provision of an amount of electrolyte in excess of that required, of course, would increase the size of the battery, particularly where the electrolyte is absorbed into a filler as is necessary in a nonspillable battery as here described.

Figure 5:
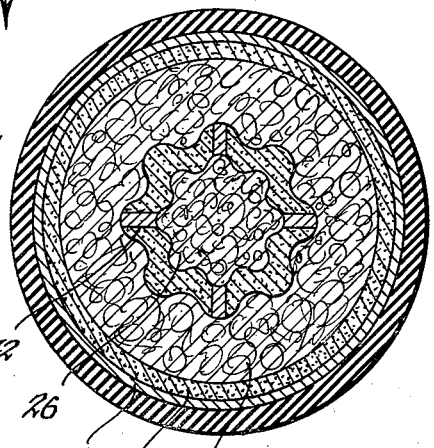
Fig. 5 is a horizontal section, taken on line 5—5, Fig. 4.

The form of the invention shown in Figs. 4 and 5 is substantially similar to the form of the invention shown in Figs. 1-3 except that the positive electrode grid is of different shape. The same reference numerals have therefore been applied to the outer shell of the battery to indicate parts which are identical to those shown in Figs. 1-3.

In the form of the invention shown in Figs. 4 and 5, the positive element or grid is provided with a central post 40 which is similar to the central post 15 of the form of the invention shown in Figs. 1-3. Instead, however, of the lower part of this positive electrode being formed of vertical bars 17 connected by circular rings 18, this lower part of the positive electrode is shown as composed of vertical bars 41 which are arranged equidistant and parallel with the axis of the post 40 and are connected by corrugated or wavy rings 42 so that the interior and exterior surfaces of the positive electrode are of wavy or undulating form, these corrugations extending lengthwise of the axis of the positive electrode. Further, in the form of the invention shown in Figs. 4 and 5 the lower end of the positive electrode is not sealed against the rubber washer 31 at the bottom of the battery shell but the positive electrode is provided at its lower end with a plurality of depending lugs 43 which serve to provide spaces 44 between the lowest ring 42 of the positive electrode and the rubber washer 31. It will be apparent that these spaces 44 provide communication between the electrolyte in the material with which the positive electrode is filled and the material contained in the annular space around this electrode, these openings 44 thereby functioning, in this regard, in the same manner as the holes 21 in the form of the invention shown in Figs. 1-3.

As shown in Figs. 4 and 5, it is also possible to provide holes extending through the metal of the positive electrode to additionally establish communication between the electrolyte contained within the positive electrode and that surrounding this electrode. Such holes are shown at 45 and are shown as arranged at certain of the points of juncture between the bars 41 and the rings 42. These holes 45 function in the same manner as the holes 21 in the form of the invention shown in Figs. 1-3 to establish communication between the electrolyte contained within and surrounding the positive electrode and it is desirable that these holes 45 be spaced in uniform distribution both lengthwise and around the positive electrode. It will further be appreciated that it is not necessary that these holes 45 be located at the points of juncture between the rings 42 and the bars 41 but that they could be suitably located anywhere in the gridwork structure of the positive electrode.

The form of the invention shown in Figs. 4 and 5 functions in the same manner as the form of the invention shown in Figs. 1-3 and hence the detailed description is not repeated. It will be appreciated, however, that by corrugating the tubular surface of the positive electrode a material increase, preferably in the order of 30% of the surface of the active material of the positive electrode is obtained without material disadvantage due to lack of uniformity in the spacing of all portions of this material from the spongy lead coating 14 of the outer shell.

From the foregoing it will be seen that the present invention provides a non-spillable rechargeable battery which has the maximum capacity and efficiency for the battery of a given size and which can be inexpensively produced so as to permit of competition of these batteries with ordinary dry batteries, such as are now used for portable work.

I claim:

A non-spillable secondary battery of the character described, comprising a tubular metal casing, a coating of active material applied to the interior of said casing to provide, with said casing, the negative electrode of said battery, a tubular central metal grid arranged coaxially within said casing in radially spaced relation thereto, said grid being made up of a plurality of coaxial axially spaced rings and axially extending spaced connecting bars to provide a plurality of openings extending therethrough and arranged the entire length and around the entire diameter of said grid, a body of active material arranged in each of said openings and forming, with said grid, a substantially cylindrical positive electrode of the battery, a filler of absorbent material containing absorbed electrolyte in suspension therein and contained within said positive electrode and within the annular space between said electrodes, said positive electrode being formed to provide a plurality of openings extending radially therethrough and providing the sole communication between the absorbed electrolyte within said positive electrode and the absorbed electrolyte surrounding said positive electrode thereby to render the inner and outer surfaces of said positive electrode effective, and end heads at the opposite ends of said casing and positive electrode.

PAUL ARNOLDI.